US 6,582,814 B2

(12) United States Patent
Swiler et al.

(10) Patent No.: US 6,582,814 B2
(45) Date of Patent: Jun. 24, 2003

(54) RARE EARTH-TRANSITION METAL OXIDE PIGMENTS

(75) Inventors: Daniel R. Swiler, Washington, PA (US); Terry J. Detrie, Cecil, PA (US); Enos A. Axtell, III, Washington, PA (US)

(73) Assignee: DMC2 Degussa Metals Catalysts Cerdec AG, Frankfurt (DE)

( * ) Notice: Subject to any disclaimer, the term of this patent is extended or adjusted under 35 U.S.C. 154(b) by 27 days.

(21) Appl. No.: 09/881,481

(22) Filed: Jun. 14, 2001

(65) Prior Publication Data

US 2002/0034644 A1 Mar. 21, 2002

Related U.S. Application Data

(63) Continuation-in-part of application No. 09/589,549, filed on Jun. 27, 2000.

(51) Int. Cl.[7] .............................. B32B 5/16; C01F 17/00
(52) U.S. Cl. ..................... 428/328; 106/1.23; 106/1.25; 106/1.26; 106/419; 106/436; 106/453; 106/456; 106/459; 106/479; 106/480; 423/21.1; 423/23; 423/49; 423/53; 423/62; 423/69; 423/99; 423/138; 428/402; 501/134; 501/152
(58) Field of Search .................................. 428/402, 323, 428/328; 106/1.25, 1.26, 1.23, 419, 453, 456, 459, 480, 479, 436; 501/134, 152; 423/21.1, 23, 53, 99, 138, 49, 62, 69

(56) References Cited

U.S. PATENT DOCUMENTS

| 3,728,594 A | * | 4/1973 | Yim et al. ............... 317/235 R |
| 4,239,548 A | | 12/1980 | Barnard et al. |
| 5,055,445 A | * | 10/1991 | Belt et al. ...................... 505/1 |
| 5,080,718 A | | 1/1992 | Sullivan et al. |
| 5,114,914 A | * | 5/1992 | Sablik et al. .................... 505/1 |
| 5,122,510 A | * | 6/1992 | Chen et al. ..................... 505/1 |
| 5,149,369 A | | 9/1992 | Eberts et al. |
| 5,252,544 A | * | 10/1993 | Maeda et al. .................. 505/1 |
| 5,348,935 A | * | 9/1994 | Morris ....................... 505/482 |
| 5,423,912 A | | 6/1995 | Sullivan et al. |
| 5,508,242 A | * | 4/1996 | Baumard et al. ........... 501/152 |
| 5,560,772 A | | 10/1996 | Huguenin et al. |
| 5,703,000 A | * | 12/1997 | Nakayama et al. ......... 501/152 |
| 5,851,587 A | | 12/1998 | Schittenhelm et al. |
| 5,858,080 A | | 1/1999 | Bugnon |
| 5,911,921 A | | 6/1999 | Takai et al. |
| 5,976,237 A | | 11/1999 | Halko et al. |
| 6,204,748 B1 | * | 3/2001 | Sorg ......................... 335/22 R |
| 6,452,957 B1 | * | 9/2002 | Burger et al. ................ 373/137 |

OTHER PUBLICATIONS

DCMA: Classification and Chemical Description of the Mixed Metal Oxide Inorganic Colored Pigments, Jan. 1982, pp. 1–68, second edition, DCMA, Arlington, VA.

Mirek Novotny, Encyclopedia of Chemical Technology, Fourth Edition, 1996, pp. 1–40, vol. 19, John Wiley & Sons, Inc.

Fred Billmeyer and Max Saltzman, Principles of Color Technology, pp. 138–141, Second Edition, John Wiley & Sons, Inc. New York.

\* cited by examiner

Primary Examiner—H. Thi Le
(74) Attorney, Agent, or Firm—Daniel P. Chillo; Eckert Seamans Cherin & Mellott, LLC

(57) ABSTRACT

Rare earth-transition metal oxides are used as pigments. The rare earth-transition metal oxide pigments are preferably of the formula $(Re_xTm)O_y$, where Re is at least one rare earth element, Tm is at least one transition metal, x ranges from 0.08 to 12, and y ranges from x+1 to 2x+2. The pigments are useful as colorants, and possess good stability.

10 Claims, No Drawings

RARE EARTH-TRANSITION METAL OXIDE PIGMENTS

CROSS REFERENCE TO RELATED APPLICATION

This application is a continuation-in-part of U.S. patent application Ser. No. 09/589,549 filed Jun. 27, 2000 which is incorporated herein by reference.

FIELD OF THE INVENTION

The present invention relates to compositions that produce novel inorganic pigments with various advantages over traditional pigment formulations. More specifically, the present invention relates to the use of compositions containing transition metals combined with rare earth metals used in pigmentary applications. The pigments may be used in plastics, paints, coatings, glass enamels and other materials.

BACKGROUND INFORMATION

Inorganic pigments are widely used in various applications such as paints, inks, plastics, rubbers, ceramics, enamels and glasses. These pigments may impart coloristic properties, and protect the coating from the effects of visible as well as ultraviolet and infrared light. These properties depend on both their visible as well as UV and IR reflectance spectrums. In addition to absorbing light, their ability to scatter or reflect light also contributes to their functionality. In order to be suitable in a wide variety of applications, they need to demonstrate a high degree of light fastness and their high temperature stability. A summary of the large number of inorganic pigments produced and some of their applications can be found in Volume 18 of the fourth edition of the Kirk-Othmer Encyclopedia of Chemical Technology, 1996. A systematic list of mixed metal oxide inorganic colored pigments is also given in the publication "DCMA: Classification and Chemical Description of the Mixed Metal Oxide Inorganic Colored Pigments", Second Edition, January 1982.

Black or dark colored colorants for the coatings and plastics industry are typically based on either carbon black, Cr—Fe based hematite blacks, or blacks formulated from various elements, but typically containing two or more of the elements Ni—Mn—Cu—Fe—Cr, arranged in a spinel type structure. Although carbon black is often the least expensive pigment to produce a black color, the Cu—Cr oxide spinel pigment is often chosen due to its ease of dispersibility as well as its temperature and weathering stability in certain resin systems.

Transition metals are used as a chromophore in a vast number of mixed metal oxide pigments. These light transition metal elements, containing titanium, vanadium, chromium, manganese, iron, cobalt, nickel, copper and zinc are listed in a large number of DCMA (Dry Color Manufacturers Association) pigment compositions.

In contrast, rare earths are used quite sparingly in inorganic pigments. A notable exception is praseodymium in praseodymium zircon yellow (DCMA 14-43-4). U.S. Pat. No. 5,911,921 describes the use of ytterbium phosphate as an IR absorbing material. U.S. Pat. No. 5,560,772 describes the use of rare earths such as terbium, cerium and praseodymium in combination with each other and zirconium oxide to form red shade compounds. U.S. Pat. Nos. 5,423,912, 5,149,369, and 4,239,548 relate to the use of a cerium as a coating layer in inorganic pigments.

SUMMARY OF THE INVENTION

The present invention provides pigments with enhanced color, composition, and performance characteristics. The pigments can be represented by the formula $(Re_xTm)O_y$, where Re represents at least one rare earth element selected from yttrium, lanthanum and elements in the Lanthanide Series of the Periodic Table, Tm represents at least one transition metal selected from Ti, V, Cr, Mn, Fe, Co, Ni, Cu and Zn, x ranges from 0.01 to 99, and y designates the number of oxygen atoms required to maintain electroneutrality. Preferably, x ranges from 0.08 to 12, more preferably from 0.25 to 4, most preferably from 0.5 to 2, and y ranges from x+1 to 2x+2. These colorants can be used to form colored objects or coatings through their use in applications such as paints, inks, plastics, glasses, ceramics and the like.

The present invention also relates to the production of rare earth-transition metal oxide pigments, substitution of other elements into these pigments, and the use of protective or functional coatings on these pigments in order to enhance their properties.

The present pigments have been found to be stable with respect to temperature and light, providing lightfast pigments. In addition, these materials tend to have a low solubility which leads to a high degree of resistance to attack from solvents, acids or bases. The pigments exhibit higher strengths than provided by typical pigments in plastics and coating applications.

Another advantage of the present pigments is that when colored ceramic or glass objects containing the pigments are recycled, less objectionable coloration is passed on to the recycled glass than with conventional black colorants which may contain cobalt, chromium, nickel, and other elements.

Another property of these pigments is their ability to change to a different color when exposed to very high temperatures. For example, when surfaces containing these materials are subjected to high temperatures by laser marking, the reactions initiated by these high temperatures allow legible marks to be obtained.

Another aspect of the present invention is to provide a method of making rare earth transition metal oxide pigments. One method includes the steps of mixing powders capable of yielding such metal oxides, and calcining the mixture.

These and other aspects of the present invention will be more apparent from the following description.

DETAILED DESCRIPTION

This invention relates to the use of rare earth oxides combined with transition metal oxides as pigments. These pigments are of the formula $(Re_xTm)O_y$, where Re represents at least one rare earth element selected from Sc, Y, La, Ce, Pr, Nd, Pm, Sm, Eu, Gd, Tb, Dy, Ho, Er, Tm, Yb and Lu, preferably at least one metal selected from Y, La, Ce, Pr, Nd, Pm and Sm. The transition metal (Tm) represents at least one metal selected from Ti, V, Cr, Mn, Fe, Co, Ni, Cu and Zn, and x ranges from 0.01 to 99, and y designates the number of oxygen atoms required to maintain electroneutrality. Preferably, x ranges from 0.08 to 12, more preferably from 0.25 to 4, most preferably from 0.5 to 2, and y ranges from x+1 to 2x+2.

Rare earth-transition metal oxide materials of the above-noted formula have been found to possess favorable colorant properties. The pigments are useful in many applications, including organic chemical compositions such as plastics, rubbers, and the like, coating compositions such as paints, printing inks, and the like, and inorganic chemical compositions such as glass enamels, porcelain enamels, ceramics and the like.

Preferred pigment compositions include $(Y_xMn)O_y$, $(Y_xCo)O_y$, $(Y_xCu)O_y$, $(Y_xCr)O_y$, $(La_xMn)O_y$, $(La_xCo)O_y$, $(La_xCu)O_y$, $(La_xCr)O_y$, $(La_xNi)O_y$, $(Ce_xV)O_y$, $(Pr_xV)O_y$, $(Pr_xMn)O_y$, $(Pr_xCo)O_y$, $(Pr_xCu)O_y$, $(Pr_xCr)O_y$, $(Nd_xV)O_y$, $(Nd_xMn)O_y$, $(Nd_xCo)O_y$, $(Nd_xCu)O_y$, $(Nd_xCr)O_y$, $(Nd_xNi)O_y$, $(Sm_xV)O_y$, $(Sm_xMn)O_y$, $(Sm_xCo)O_y$, $(Sm_xCu)O_y$ and $(Sm_xCr)O_y$.

The present pigments may include at least one dopant selected from Groups I-A, II-A, III-A, IV-A, V-A, VI-A, VII-A, VIII-A, I-B, II-B, III-B, IV-B, V-B, VIII-B, the Actinide elements and the Lanthanide elements in a total amount of up to 50 mol percent.

In one embodiment of the invention, the rare earth-transition metal pigments comprise $PrMnO_3$. Iron, cobalt and other metal atoms may fully or partially substitute for the manganese constituents of such a Pr-Mn oxide pigment, and lanthanum and other rare earths may fully or partially substitute for the praseodymium. Some other preferred compositions include $PrCoO_3$, $LaCoO_3$, $YMnO_3$, $LaMnO_{3.15}$, $La(NiMn)O_3$, $Nd_2NiO_4$, $Nd_2CuO_4$ and $Y_2Cu_2O_5$.

The present rare earth-transition metal oxide pigments typically have average particle sizes of from about 0.1 to about 20 microns, preferably from about 0.2 to about 10 microns, and more preferably from about 0.5 to about 5 microns. In some embodiments, the morphology of the pigment particles is substantially equiaxed. However, other morphologies may be possible, such as platelets and elongated shapes.

The rare earth-transition metal oxide pigments of the present invention may be formed by processes such as calcination techniques, sol-gel techniques and chemical precipitation, which may then be followed with a calcination step. A particularly preferred process for making the present rare earth-transition metal oxide pigments is to mix the respective M oxides or carbonate powders, followed by calcination. Mixing includes the processes of milling the pigments, either dry or wet, pulverizing, blending or like processes. In this embodiment, the mixed powders are preferably calcined at temperatures of from about 500 to about 1,500° C., more preferably from about 700 to about 1,300° C. Calcination times of from about 1 to about 60 hours are preferred, more preferably from about 2 to about 16 hours.

The pigment composition may be formed, for example, by mixing rare earth containing powders such as oxides or carbonates with transition metal containing powders such oxides, carbonates, or hydroxides in the appropriate ratio to form the desired composition, followed by calcining.

A full or partial coating of one or more layers may be placed on the surface of the inorganic pigment. Inorganic pigment coatings are known in the art. Examples of coating compositions which may be suitable for use with the present pigments are disclosed in U.S. Pat. Nos. 5,851,587, 5,976,237 and 5,858,080, which are incorporated herein by reference. Coatings may be applied for a variety of reasons. In the case where there is an unfavorable reaction between the surface of the pigment and the medium where it is being used, a protective layer is often used. These protective layers are typically silica, alumina and other metal oxides, but may also be other elements, compounds or organic materials. Functional coatings may be applied in order to change the conductivity of the surface, increase dispersibility, modify optical properties or enhance the surface reactivity.

Exemplary coating methods include precipitation, which is typically initiated by passing the pH of a solution through the isoelectric point, whereby the free energy of the system is minimized by deposition onto the surface of the particle. Another method comprises coating the pigment particles with a liquid that contains the coating material either in solution or suspension, and drying the particles until a solid coating is produced on the surface of the pigment. Other methods known to the art may also be used.

The pigments of the present invention may be used as colorants for various types of substrates. Plastic or rubber compositions to which the rare earth-transition metal oxide pigments may be added in accordance with this invention include polymeric materials that are natural or synthetic. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produce by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methacrylic acid esters, butadiene, as well as copolymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures as plastic material or melts spun into fibers. They can also be dissolved as film formers or binders for lacquers, paints, or printing inks such as linseed oil, nitrocellulose, melamine resins, acrylic resins, ureaformaldehyde resins and the like.

The present rare earth-transition metal oxide pigments may also be incorporated in a liquid or a paste form. Suitable liquid carriers for the rare earth-transition metal oxide pigments include water, pine oils, vegetable oils, mineral oils, low molecular weight petroleum fractions, tridecyl alcohols, synthetic resins and natural resins.

In a further embodiment, a substrate may be coated with the above glass-ceramic enamel composition, and then fired. The substrate may comprise, for example, automotive glass, architectural glass, container glass, metal or the like.

In a further embodiment, the pigment may be coated onto a substrate to provide reflective properties. In the case of multiple reflective layers, the pigment may contribute to the visible and invisible optical properties of the composite material containing this novel pigment.

These compositions may also be used as surface layers in combination with other materials to form specific optical effects. Examples of this is the precipitation of iron oxide and silica onto mica to form one of the types of pearlescent pigments.

The following examples are intended to illustrate various aspects of the present invention, are not intended to limit the scope of the invention.

EXAMPLE 1

A pigment was prepared by mixing the raw materials in the weight percentages as shown in Table 1. This mixture was then blended and pulverized in a hammer mill through a 0.020 inch screen. The resultant mixture was placed in a ceramic crucible, and fired in a gas kiln at temperatures ranging from 1,000 to 1,200 degrees C. for 4 hours. After cooling, the calcined mass was ground down in a mortar and pestle, and was milled in a laboratory ball mill with 1,400 g of media, and 300 ml of water for 6 hours.

TABLE 1

| Sample No. | $Pr_6O_{11}$ | $MnO_2$ | CuO | $CoO_x$ 71% |
|---|---|---|---|---|
| 1 | 170.3 | 87 | | |
| 2 | 170.3 | | 79.5 | |
| 3 | 170.3 | | | 81.8 |
| 4 | 170.3 | 43.5 | | 40.9 |
| 5 | 170.3 | 29 | 26.5 | 27.3 |

TABLE 2

| Heat treatment | Hold Temperature. |
|---|---|
| A | 1,000° C. |
| B | 1,100° C. |
| C | 1,200° C. |

The resultant pigment 1A had a crystal structure as determined by X-ray diffraction to be similar to that of calcium lanthanum manganese oxide, $(La_{0.6}Ca_{0.4})MnO_3$.

The structure of 2A was similar to that of copper cerium praseodymium oxide, $Pr_{1.85}Ce_{0.15}CuO_4$.

The structure of 3A was similar to that of cobalt praseodymium oxide, $PrCoO_3$.

The structure of 4A was similar to that of a mixture of calcium lanthanum manganese oxide, $(La_{0.6}Ca_{0.4})MnO_3$ and cobalt praseodymium oxide, $PrCoO_3$.

The structure of 5A was similar to that of calcium lanthanum manganese oxide, $(La_{0.6}Ca_{0.4})MnO_3$.

Although the x-ray diffraction patterns did not identify a pattern with the same composition, a reaction apparently occurs which forms rare earth-transition metal compounds that are similar in structure to known compounds.

Masstone trials are prepared by mixing 2 grams of pigment with 70 grams of a RPVC resin system containing $TiO_2$, with a total combined weight of 72 grams. This mixture is dispersed on a heated two-roll mill at 420° F. for a period of 3 minutes. Measurements of color values are performed using a Datacolor CS-5. The standard CIELAB $L^*a^*b^*$ system is used to define the color of the pigment. The $L^*$ refers to the lightness of the sample, with $L^*=100$ designating the lightness upper limit and $L^*=0$ designating the darkness lower limit. The $a^*$ describes the red or green value of the pigment, with a positive $a^*$ value designating red, and a negative $a^*$ value designating green. The $b^*$ value represents the blue or yellow value, with a positive $b^*$ value designating yellow and a negative $b^*$ value designating blue.

The tint color values of the sample are listed in Table 3.

TABLE 3

CIELAB Coordinates as tested in RPVC Tint

| Sample | $L^*$ | $a^*$ | $b^*$ |
|---|---|---|---|
| Cu-Cr 1 | 54.42 | −1.74 | −4.39 |
| 1A | 50.43 | −0.64 | 0.77 |
| 1B | 50.37 | −1.43 | −2.60 |
| 1C | 50.63 | −1.59 | −4.00 |
| 2A | 56.54 | −1.36 | −1.46 |
| 3A | 46.82 | −0.67 | −2.60 |
| 3B | 46.56 | −0.79 | −3.08 |
| 3C | 45.74 | −0.78 | −3.06 |
| 4A | 46.83 | −0.37 | −2.07 |
| 4B | 46.57 | −0.46 | −3.30 |
| 4C | 44.86 | −0.38 | −3.69 |
| 5A | 48.60 | −0.67 | −3.24 |
| 5B | 47.57 | −0.06 | −1.47 |
| 5C | 54.07 | −0.15 | −1.43 |

Selected pigments were tested in comparison with conventional inorganic pigments. Cu—Cr 1 represents a copper chromite black spinel sold by Shepard as Black 1. Ni—Mn—Fe—Cr represents a pigment sold by dmc² as 10333. Co—Cr—Fe is a black spinel pigment sold as 10335. The results show that the tint strength, which is the inverse of the amount of pigment needed to reach a desired darkness when combined with $TiO_2$, is much higher for the present rare earth transition metals compounds compared with the traditional materials formulated solely with transition metal compounds. These results are presented in Table 4.

TABLE 4

Strength comparison tests in RPVC tint

| RPVC Tint | Strength | $L^*$ | $a^*$ | $b^*$ | $DE^*$ | $DE^{*1)}$ |
|---|---|---|---|---|---|---|
| Cu-Cr 1 | 100 | 55.57 | −1.63 | −4.23 | | |
| Ni-Mn-Fe-Cr | 116.36 | 53.73 | 0.02 | −3.98 | 2.48 | 1.66 |
| Co-Cr-Fe | 91.31 | 56.66 | −0.63 | −3.18 | 1.81 | 1.42 |
| 1C, Pr-Mn | 145.18 | 51.39 | −1.45 | −3.84 | 4.21 | 0.53 |
| 3C, Pr-Co | 224.21 | 46.6 | −0.61 | −2.91 | 9.12 | 1.71 |
| 4C, Pr-Co-Mn | 246.13 | 45.47 | −0.23 | −3.44 | 10.23 | 1.56 |

[1]) = after adjusting the color-strength

Additional testing was performed in paint applications. These tests examined the tint strength compared to only the Cu—Cr black. Results are shown in Table 5.

TABLE 5

Strength comparison tests performed in Kynar Coil Coat paint formulation

| PrCo vs Shepherd 1 | Strength | $L^*$ | $a^*$ | $b^*$ | $DL^*$ | $Da^*$ | $Db^*$ | $DE^*$ |
|---|---|---|---|---|---|---|---|---|
| 1C 50W | | 43.14 | −1.39 | −3.53 | | | | |
| CuCr 1 50W | 55.07 | 49.49 | −1.57 | −4.47 | 6.36 | −0.18 | −0.94 | 6.43 |
| 1C 90W | | 68.36 | −1.74 | −2.8 | | | | |
| CuCr 1 90W | 50.33 | 74.51 | −1.8 | −3.22 | 6.15 | −0.06 | −0.42 | 6.17 |
| 1C Masstone | | 25.88 | 0.03 | −0.26 | | | | |
| CuCr 1 Masstone | | 25.83 | 0.38 | −0.19 | −0.04 | 0.35 | 0.07 | 0.35 |

Once again, significantly higher strengths were shown for IC than the commercial Cu—Cr black. It also should be noted that the masstone color, which represents the use of this pigment without $TiO_2$, is very close to that of the commercial Cu—Cr black.

Numerous examples were prepared as described in Example 1. In each case, the amounts of the raw materials, the calcining temperature, and information on the resultant crystal structure is shown in Table 6. The nomenclature used in Table 6 corresponds to the following procedure. The material was prepared as described in Example 1 by mixing (Gram1) grams of (RM1) and (Gram2) grams of (RM2). This mixture was then blended and pulverized in a hammer mill through a 0.020 inch screen. The resultant mixture was placed in a ceramic sagger, and fired in a gas kiln at (Temp) degrees C. for 12 hours. After cooling, the calcined mass was ground down in a mortar and pestle, and was milled in a laboratory ball mill with 1,400 g of media, and 300 ml of water for 6 hours. The pigment had an X-Ray diffraction pattern similar to (Formula). Although we do not intend to be limited by this evaluation, we believe the resultant compound contains the metals (Met1) and (Met2) in a (Ratio) metal ratio. The pigment had a (Color) visual color.

TABLE 6

| Sample No. | Gram1 | RM1 | Gram2 | RM2 | Temp C. | Formula | Met1 | Met2 | Ratio | Color |
|---|---|---|---|---|---|---|---|---|---|---|
| 028-04 | 112.9 | $Y_2O_3$ | 79.9 | $TiO_2$ | 1200 | $Y_2Ti_2O_7$ | Yttrium | Titanium | 1:1 | White |
| 102-01 | 91.45 | $La_2O_3$ | 34.94 | $TiO_2$ | 1250 | $La_2Ti_2O_7$ | Cerium | Titanium | 1:1 | White |
| 028-08 | 170.3 | $Pr_6O_{11}$ | 79.9 | $TiO_2$ | 1200 | $Pr_2Ti_2O_7$ | Praseodymium | Titanium | 1:1 | Tan |
| 102-03 | 69.30 | $NdO_2$ | 39.94 | $TiO_2$ | 1250 | $Nd_2Ti_2O_7$ | Neodymium | Titanium | 1:1 | White |
| 102-04 | 43.59 | $Sm_2O_3$ | 19.98 | $TiO_2$ | 1250 | $Sm_2Ti_2O_7$ | Samarium | Titanium | 1:1 | White |
| 103-01 | 56.5 | $Y_2O_3$ | 45.47 | $V_2O_5$ | 900 | $YVO_4$ | Yttrium | Vanadium | 1:1 | White |
| 103-02 | 91.45 | $La_2O_3$ | 45.47 | $V_2O_5$ | 900 | $LaVO_4$ | Lanthanum | Vanadium | 1:1 | White |
| 103-03 | 86.05 | $CeO_2$ | 45.47 | $V_2O_5$ | 900 | $CeVO_4$ | Cerium | Vanadium | 1:1 | Brown |
| 103-04 | 85.11 | $Pr_6O_{11}$ | 45.47 | $V_2O_5$ | 900 | $PrVO_4$ | Praseodymium | Vanadium | 1:1 | Tan |
| 103-05 | 69.3 | $NdO_2$ | 45.47 | $V_2O_5$ | 900 | $NdVO_4$ | Neodymium | Vanadium | 1:1 | Pink Grey |
| 103-06 | 43.59 | $Sm_2O_3$ | 22.73 | $V_2O_5$ | 900 | $SmVO_4$ | Samarium | Vanadium | 1:1 | White |
| 104-01 | 56.5 | $Y_2O_3$ | 38 | $Cr_2O_3$ | 1250 | $YCrO_3$ | Yttrium | Chromium | 1:1 | Green |
| 104-02 | 91.45 | $La_2O_3$ | 38 | $Cr_2O_3$ | 1250 | $LaCrO_3$ | Lanthanum | Chromium | 1:1 | Olive |
| 104-04 | 85.11 | $Pr_6O_{11}$ | 38 | $Cr_2O_3$ | 1250 | $CrPrO_3$, $CrNdO_3$ structure | Praseodymium | Chromium | 1:1 | Olive |
| 104-05 | 69.3 | $NdO_2$ | 38 | $Cr_2O_3$ | 1250 | $CrNdO_3$ | Neodymium | Chromium | 1:1 | Green |
| 104-06 | 43.59 | $Sm_2O_3$ | 19 | $Cr_2O_3$ | 1250 | $SmCrO_3$ | Samarium | Chromium | 1:1 | Green |
| 105-01 | 87.18 | $Sm_2O_3$ | 43.5 | $MnO_2$ | 1250 | $SmMnO_3$ | Samarium | Manganese | 1:1 | Black |
| 105-02 | 91.45 | $La_2O_3$ | 43.92 | $Fe_2O_3$ | 1250 | $FeLaO_3$ | Lanthanum | Iron | 1:1 | Buff |
| 028-07 | 170.3 | $Pr_6O_{11}$ | 79.9 | $Fe_2O_3$ | 1200 | $PrFeO_3$ | Praseodymium | Iron | 1:1 | Tan |
| 105-04 | 69.30 | $NdO_2$ | 43.92 | $Fe_2O_3$ | 1250 | $FeNdO_3$ | Neodymium | Iron | 1:1 | Tan |
| 105-05 | 43.59 | $Sm_2O_3$ | 43.92 | $Fe_2O_3$ | 1250 | $FeSmO_3$ | Samarium | Iron | 1:1 | Buff |
| 106-01 | 91.45 | $La_2O_3$ | 47.5 | CoO | 1250 | $LaCoO_3$ | Lanthanum | Cobalt | 1:1 | Black |
| 028-06 | 170.3 | $Pr_6O_{11}$ | 81.8 | CoO | 1200 | $PrCoO_3$ | Praseodymium | Cobalt | 1:1 | Black |
| 106-03 | 69.30 | $NdO_2$ | 47.5 | CoO | 1250 | $NdCoO_3$ | Neodymium | Cobalt | 1:1 | Black |
| 106-04 | 87.18 | $Sm_2O_3$ | 47.5 | CoO | 1250 | $SmCoO_3$ | Samarium | Cobalt | 1:1 | Black |
| 107-02 | 91.45 | $La_2O_3$ | 37.35 | NiO | 1250 | $La_2NiO_4$, NiO | Lanthanum | Nickel | 2:1 | Black |
| 087-03 | 85.2 | $Pr_6O_{11}$ | 37.3 | NiO | 1200 | $NiPr_2O_4$ | Praseodymium | Nickel | 2:1 | Black |
| 107-04 | 69.3 | $NdO_2$ | 37.35 | NiO | 1250 | $NiNd_2O_4$, NiO | Neodymium | Nickel | 2:1 | Black |
| 108-01 | 91.45 | $La_2O_3$ | 39.77 | CuO | 980 | $La_2CuO_4$ & Unident. | Lanthanum | Copper | 2:1 | Black |
| 108-03 | 69.3 | $NdO_2$ | 39.77 | CuO | 980 | $CuNd_2O_4$, CuO | Neodymium | Copper | 2:1 | Black |
| 108-04 | 87.18 | $Sm_2O_3$ | 39.77 | CuO7 | 980 | $CuSm2O4$, CuO minor | Samarium | Copper | 2:1 | Black |
| 012-A | 80.38 | $La_2O_3$ | 19.62 | CuO | 1000 | La2CuO4 | Lanthanum | Copper | 2:1 | Black |
| 096-B | 60.8 | $Pr_6O_{11}$ | 14.2 | CuO | 1000 | Pr2CuO4 | Praseodymium | Copper | 2:1 | Black |
| 012-C | 80.88 | $Nd_2O_3$ | 19.12 | CuO | 1000 | Nd2CuO4 | Neodymium | Copper | 2:1 | Black |
| 131 | 58.67 | $Y_2O_3$ | 41.33 | CuO | 1000 | $Cu2Y_2O_5$ | Yttrium | Copper | 1:1 | Green |

Masstone trials are prepared by mixing 2 grams of pigment with 70 grams of an unpigmented RPVC resin system, with a total combined weight of 72 grams. This mixture is dispersed on a heated two-roll mill at 420° F. for a period of 3 minutes. Measurements of color values and reflectance percentage at a wavelength of 1,100 nm are performed using a Datacolor CS-5. The standard CIELAB L*a*b* system is used to define the color of the pigment. The L* refers to the lightness of the sample, with L*=100 designating the lightness upper limit and L*=0 designating the darkness lower limit. The a* describes the red or green value of the pigment, with a positive a* value designating red, and a negative a* value designating green. The b* value represents the blue or yellow value, with a positive b* value designating yellow and a negative b* value designating blue. Additionally, the reflection percentage of the sample in the infrared region, measured at 1,100 nm is listed in the table under the column IR 1100. The masstone color values and IR reflectance values of the sample are listed in Table 7.

TABLE 7

| | Masstone RPVC Color | | | |
|---|---|---|---|---|
| Sample No. | L* | a* | b* | IR 1100 |
| 102-01 | 90.68 | −1.66 | 4.43 | 69 |
| 102-02 | 89.26 | −0.19 | 9.17 | 77 |
| 102-03 | 81.17 | −1.25 | −3.33 | 74 |
| 102-04 | 91.65 | −1.41 | 5.52 | 72 |
| 103-01 | 86.87 | −1.60 | 7.57 | 66 |
| 103-02 | 89.41 | −1.74 | 4.36 | 65 |
| 103-03 | 40.98 | 8.43 | 5.78 | 60 |
| 103-04 | 73.19 | −0.77 | 15.27 | 62 |
| 103-05 | 69.31 | 0.68 | 5.61 | 51 |
| 103-06 | 86.27 | −2.28 | 1.74 | 47 |
| 104-01 | 67.96 | −14.38 | 16.93 | 64 |
| 104-02 | 68.69 | −7.46 | 13.97 | 53 |
| 104-03 | 61.26 | −13.1 | 15.01 | 70 |
| 104-04 | 66.26 | −5.99 | 13.71 | 59 |
| 104-05 | 64.95 | −9.67 | 12.94 | 59 |
| 104-06 | 70.28 | −9.02 | 14.74 | 53 |
| 105-01 | 29.33 | 1.37 | 1.95 | 18 |
| 105-02 | 62.37 | 18.7 | 47.79 | 52 |
| 105-03 | 44.97 | 22.92 | 13.97 | 67 |

TABLE 7-continued

Masstone RPVC Color

| Sample No. | L* | a* | b* | IR 1100 |
|---|---|---|---|---|
| 105-04 | 51.85 | 19.43 | 32.8 | 53 |
| 105-05 | 56.73 | 19.77 | 40.49 | 47 |
| 106-01 | 26.02 | 0.04 | 0.32 | 6 |
| 106-02 | 37.88 | 0.38 | 0.65 | 28 |
| 106-03 | 27.96 | 0.05 | 0.51 | 8 |
| 106-04 | 27.64 | 0.05 | 0.3 | 9.5 |
| 107-01 | 52.03 | 1.95 | 10.25 | 34 |
| 107-02 | 32 | −0.98 | 0.2 | 6 |
| 107-03 | 60.97 | 1.94 | 9.38 | 43 |
| 087-03 | 29.25 | −0.33 | 0.27 | 6 |
| 107-04 | 30.46 | −0.41 | 0.66 | 6 |
| 107-05 | 52.6 | 1.95 | 9.54 | 30 |
| 108-01 | 28.21 | 1.76 | 1.7 | 10 |
| 108-02 | 37.6 | 1.28 | 2.99 | 11 |
| 108-03 | 28.15 | 0.34 | 0.72 | 11 |
| 108-04 | 27.45 | 0.37 | 0.39 | 14 |
| 012-A | 28.16 | 2.09 | 1.83 | 14 |
| 096-B | 26.87 | 0.18 | −0.39 | 9 |
| 012-C | 26.76 | 0.17 | 0.15 | 7 |
| 131 | 40.65 | −18.43 | −5.93 | 33 |

The present rare earth-transition metal oxide pigments possess several advantages. The pigments have good pigmentary properties in the visible range. They are stable in a wide range of applications, and have demonstrated excellent heat and weathering ability.

Whereas particular embodiments of this invention have been described above for purposes of illustration, it will be evident to those skilled in the art that numerous variations of the details of the present invention may be made without departing from the invention as defined in the appended claims.

What is claimed is:

1. A coating composition comprising:

a liquid carrier; and a pigment comprising rare earth-transition metal oxide dispersed in the carrier, wherein the rare earth-transition metal oxide is of the formula $(Re_xTm)O_y$, where Re is at least one rare earth element selected from Y, La, Ce, Pr, Nd, Pm, Sm, Eu, Gd, Tb, Dy, Ho, Er, Tm, Yb and Lu, Tm is at least one transition metal selected from Ti, V, Cr, Mn, Fe, Co, Ni, Cu and Zn, x ranges from 0.08 to 12, and y ranges from x+1 to 2x+2.

2. The coating composition of claim 1, wherein the pigment comprises from about 0.1 to about 50 weight percent of the coating composition.

3. An enamel composition comprising:

at least one glass frit; and a pigment comprising rare earth-transition metal oxide, wherein the rare earth-transition metal oxide is of the formula $(Re_xTm)O_y$, where Re is at least one rare earth element selected from Y, La, Ce, Pr, Nd, Pm, Sm, Eu, Gd, Tb, Dy, Ho, Er, Tm, Yb and Lu, Tm is at least one transition metal selected from Ti, V, Cr, Mn, Fe, Co, Ni, Cu and Zn, x ranges from 0.08 to 12, and y ranges from x+1 to 2x+2.

4. The enamel composition of claim 3, wherein the pigment comprises from about 0.1 to about 70 weight percent and the at least one glass frit comprises from about 30 to about 99.9 weight percent of the enamel composition.

5. An article comprising:

a substrate matrix; and a pigment comprising rare earth-transition metal oxide dispersed in the substrate matrix, wherein the rare earth-transition metal oxide is of the formula $(Re_xTm)O_y$, where Re is at least one rare earth element selected from Y, La, Ce, Pr, Nd, Pm, Sm, Eu, Gd, Tb, Dy, Ho, Er, Tm, Yb and Lu, Tm is at least one transition metal selected from Ti, V, Cr, Mn, Fe, Co, Ni, Cu and Zn, x ranges from 0.08 to 12, and y ranges from x+1 to 2x+2.

6. An article comprising:

a substrate; and a coating including a pigment comprising rare earth-transition metal oxide covering at least a portion of the substrate, wherein the rare earth-transition metal oxide is of the formula $(Re_xTm)O_y$, where Re is at least one rare earth element selected from Y, La, Ce, Pr, Nd, Pm, Sm, Eu, Gd, Tb, Dy, Ho, Er, Tm, Yb and Lu, Tm is at least one transition metal selected from Ti, V, Cr, Mn, Fe, Co, Ni, Cu and Zn, x ranges from 0.08 to 12, and y ranges from x+1 to 2x+2.

7. The article of claim 6, wherein the substrate comprises glass, ceramic, metal, plastic, carbon or composite.

8. A method of making a rare earth-transition metal oxide pigment comprising:

mixing powders of rare earth oxide or precursors capable of forming a rare earth oxide with a transition metal oxide or precursors capable of forming a transition metal oxide; and calcining the mixture to form a pigment of the formula $(Re_xTm)O_y$, where Re is at least one rare earth element selected from Y, La, Ce, Pr, Nd, Pm, Sm, Eu, Gd, Tb, Dy, Ho, Er, Tm, Yb and Lu, Tm is at least one transition metal selected from Ti, V, Cr, Mn, Fe, Co, Ni, Cu and Zn, x ranges from 0.08 to 12, and y ranges from x+1 to 2x+2.

9. The method of claim 8, further comprising calcining the mixture at a temperature of from about 700 to about 1,400 degrees C.

10. The method of claim 8, further comprising comminuting the calcined mixture to an average particle size of from about 0.1 to about 10 microns.

* * * * *